UNITED STATES PATENT OFFICE.

STANISLAUS KALAMAIKOWSKI, OF NEW YORK, N. Y., ASSIGNOR TO THE ELECTRIC FIRE PROOFING COMPANY, OF SAME PLACE.

FIREPROOF PAINT.

SPECIFICATION forming part of Letters Patent No. 556,849, dated March 24, 1896.

Application filed September 20, 1895. Serial No. 563,131. (No specimens.)

*To all whom it may concern:*

Be it known that I, STANISLAUS KALAMAIKOWSKI, residing in the city, county, and State of New York, have invented certain new and useful Improvements in Fireproof Paint, of which the following is a specification.

My invention relates to fireproof paint, and has for its object to produce paint which will successfully resist high temperatures, so as to protect the articles which it may envelop from fire.

To this end my invention consists, first, in a fireproofing composition, and, secondly, in a paint produced with said fireproofing composition as an ingredient, all of which will be more fully hereinafter set forth and claimed.

In making my fireproofing composition I take feldspar or marble-dust, soda-ash, sand, white lead, caustic soda or carbonate of potash, barytes, and borax. I incorporate these ingredients together and fuse them at a high temperature and produce a solid compound, which I afterward grind and use for fireproofing basis of a fireproof paint.

My fireproofing composition may consist of the ingredients named in various proportions; so I do not limit myself to any specific proportions.

I find that the ingredients in the following proportions will answer very well; so I will now proceed to set forth in detail one method of producing my fireproof composition and paint, leaving it to be understood, however, that I do not limit myself to the precise ingredients and proportions specified.

In producing my fireproof composition I take five hundred pounds feldspar or marble-dust, three hundred pounds soda-ash, two hundred pounds sand, five hundred pounds white lead, one hundred pounds caustic soda or carbonate of potash, two hundred and fifty pounds barytes, and one hundred and fifty pounds borax. I thoroughly incorporate these ingredients into a mass and thereupon fuse them together at a high temperature—say, about 4,000° centigrade—the resulting product being a translucent solid. This solid constitutes my fireproofing composition, and I proceed to grind this solid very fine in order that it may be held in suspension in a liquid as is ordinary paint-pigment.

My fireproof paint may be made as follows: In order to produce twelve gallons of paint, I first take six pounds of the composition above mentioned and add thereto two pounds of borax and four pounds of a composition comprising phosphate and sulphate of ammonia in about equal proportions. I then add twenty-five pounds of oxide of zinc and six pounds of chloride of zinc, in bulk, and twenty-four pounds of water. After thoroughly mixing the same a thick paste will be the result. I then submit this paste to artificial heat until all the water has evaporated therefrom, leaving my composition in a solidified form, which, after grinding, I mix with oil, color, and ordinary pigments, as the case may require to make up the remainder of bulk for twelve gallons of paint, the ingredients being all thoroughly incorporated together.

What I claim, and desire to secure by Letters Patent, is—

1. A fireproofing compound consisting of feldspar, soda-ash, sand, white lead, caustic soda, barytes, and borax fused together at a high temperature, as specified.

2. As a new and useful article of manufacture, the herein-described fireproofing paint consisting of feldspar, soda-ash, sand, white lead, caustic soda, barytes and borax, fused together and combined, oil, color and pigments, as specified.

3. As a new and useful article of manufacture, the herein-described fireproof paint consisting of a solidified composition of the following ingredients in about the proportion specified; phosphate and sulphate of ammonia, feldspar, soda-ash, sand, white lead, caustic soda, barytes, and borax, together with oil, color and pigment, as specified.

STANISLAUS KALAMAIKOWSKI.

Witnesses:
CHARLES E. SMITH,
GEO. E. MORSE.